United States Patent
Nuzzo et al.

(10) Patent No.: US 9,083,223 B2
(45) Date of Patent: Jul. 14, 2015

(54) ELECTRIC DIRECT-CURRENT MOTOR

(71) Applicant: Johnson Electric S.A., Murten (CH)

(72) Inventors: Gionatan Nuzzo, Asti (IT); Pier Angelo Farello, Asti (IT)

(73) Assignee: JOHNSON ELECTRIC S.A., Murten (CH)

( * ) Notice: Subject to any disclaimer, the term of this patent is extended or adjusted under 35 U.S.C. 154(b) by 298 days.

(21) Appl. No.: 13/684,530

(22) Filed: Nov. 24, 2012

(65) Prior Publication Data

US 2013/0134811 A1    May 30, 2013

(30) Foreign Application Priority Data

Nov. 25, 2011 (IT) .............................. TO2011A1086

(51) Int. Cl.
*H02K 11/02* (2006.01)
*H02K 5/22* (2006.01)

(52) U.S. Cl.
CPC .............. *H02K 11/02* (2013.01); *H02K 11/026* (2013.01); *H02K 5/225* (2013.01)

(58) Field of Classification Search
CPC ... H02K 11/026; H02K 5/225; H02K 11/024; H02K 11/02
USPC ....................... 310/51, 71–72, 239
See application file for complete search history.

(56) References Cited

U.S. PATENT DOCUMENTS

| | | | | |
|---|---|---|---|---|
| 4,673,837 A * | 6/1987 | Gingerich et al. | ............ | 310/239 |
| 5,194,769 A * | 3/1993 | Ade et al. | ........... | 310/51 |
| 5,949,173 A * | 9/1999 | Wille et al. | ................... | 310/220 |
| 5,983,484 A * | 11/1999 | Harada et al. | ................... | 29/596 |
| 6,653,754 B2 * | 11/2003 | Uchida et al. | ................... | 310/51 |
| 6,677,693 B2 * | 1/2004 | Ooyama | ...................... | 310/239 |
| 7,511,393 B2 * | 3/2009 | Mizutani | ..................... | 310/68 R |
| 7,605,506 B2 * | 10/2009 | Kanda et al. | ..................... | 310/71 |

FOREIGN PATENT DOCUMENTS

CN          101110531 A     1/2008

* cited by examiner

*Primary Examiner* — Thanh Lam
(74) *Attorney, Agent, or Firm* — Muncy, Geissler, Olds & Lowe, P.C.

(57) ABSTRACT

An electric D.C. motor, in particular for a cooling fan of a vehicle, has a brush holder. The brush holder has a carrier structure having a plurality of brush cages mounted therein. Brushes, radially displaceable within the brush cages are connected, respectively, to a positive supply terminal and a negative supply terminal. An electric supply connector and a filter for preventing the emission of electromagnetic interference, are associated with the brush holder. Components of the filter, including first and second inductors and at least one capacitor are housed inside the electric supply connector.

12 Claims, 5 Drawing Sheets

ELECTRIC DIRECT-CURRENT MOTOR

CROSS REFERENCE TO RELATED APPLICATIONS

This non-provisional patent application claims priority under 35 U.S.C. §119(a) from Patent Application No. TO 2011 A 001086 filed in Italy on Nov. 25, 2011.

FIELD OF THE INVENTION

This invention relates to a direct current (D.C.) electric motor and in particular, to an electric motor for a cooling fan of a motor vehicle, having a filter for preventing electromagnetic interference (EMI).

BACKGROUND OF THE INVENTION

More specifically, the invention relates to an electric direct-current motor comprising a brush holder including a carrier structure having, mounted therein, about the axis of rotation of the motor, a plurality of brush cages inside which respective brushes connected, respectively, to a positive supply terminal and a negative supply terminal are radially displaceable; with the brush holder there being associated: connection means comprising an electric supply connector including a body connected laterally to the brush holder, for connection of the brushes to an external voltage source; and filter means for preventing the emission of electromagnetic interference, comprising at least a first and a second inductor connected between said positive and negative terminals and the corresponding brushes, and at least one capacitor.

Electric motors of this type are known where the filter for preventing the emission of electromagnetic disturbances typically comprise two inductors arranged physically in two opposite side portions of the carrier structure of the brush holder, each between a positive brush and a negative brush, as well as one or more capacitors, so as to form overall one or more filters of the LC type, suitable for limiting the emission of electromagnetic interference (EMI).

SUMMARY OF THE INVENTION

The present invention arises from experimental work carried out by the inventors and aimed at improving the features for preventing the emission of electromagnetic interference in such a motor.

This is achieved in the present invention by housing components of the EMI filter inside the aforementioned electric supply connector, at least partially.

Accordingly, in one aspect thereof, the present invention provides an electric D.C. motor, in particular for a cooling fan of a vehicle, comprising: a brush holder including a carrier structure having, mounted therein, about the axis of rotation of the motor, a plurality of brush cages inside which respective brushes connected, respectively, to a positive supply terminal and a negative supply terminal are radially displaceable; with the brush holder there being associated: an electric supply connector including a body connected laterally to the brush holder, for connection of the brushes to an external voltage source, and a filter for preventing the emission of electromagnetic interference, comprising at least a first and a second inductor connected between said positive and negative supply terminals and the corresponding brushes, and at least one capacitor; wherein the filter is housed inside the electric supply connector.

Preferably, the electric supply connector comprises an electrically insulating support structure which extends in a plane substantially orthogonal to the axis of rotation of the motor and which includes a portion which is remote from the brush holder and where said positive and negative supply terminals are situated, and a portion which is close to the brush holder and where said first and second inductors are arranged.

Preferably, said positive and negative supply terminals are arranged essentially coplanar and transversely side-by-side, parallel to a radial direction transverse with respect to the axis of rotation of the motor, and said first and second inductors comprise respective windings which are arranged side-by-side and parallel to each other, between said positive and negative supply terminals and the brush holder.

Preferably, said at least one capacitor is connected between said positive and negative supply terminals.

Preferably, said capacitor has an essentially cylindrical shape and is arranged between said inductors and said positive and negative supply terminals, transversely with respect to the first and second inductors.

Preferably, said capacitor is disposed transversely with respect to the first and second inductors.

Preferably, said at least one capacitor is connected between the negative supply terminal and a ground conductor of the motor.

Preferably, said filter comprises a further capacitor connected between the positive supply terminal and said ground conductor of the motor.

Preferably, the capacitors are arranged parallel to the windings of the aforementioned first and second inductors, on either side, respectively, of the assembly formed by the inductors, respectively.

Preferably, the electric supply connector is of the male or female type, intended to be coupled with a corresponding complementary electric connector of the female or male type.

Preferably, in the electric supply connector respective insulated electrical conductors of a flexible supply cable are permanently connected to the positive and negative supply terminals.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
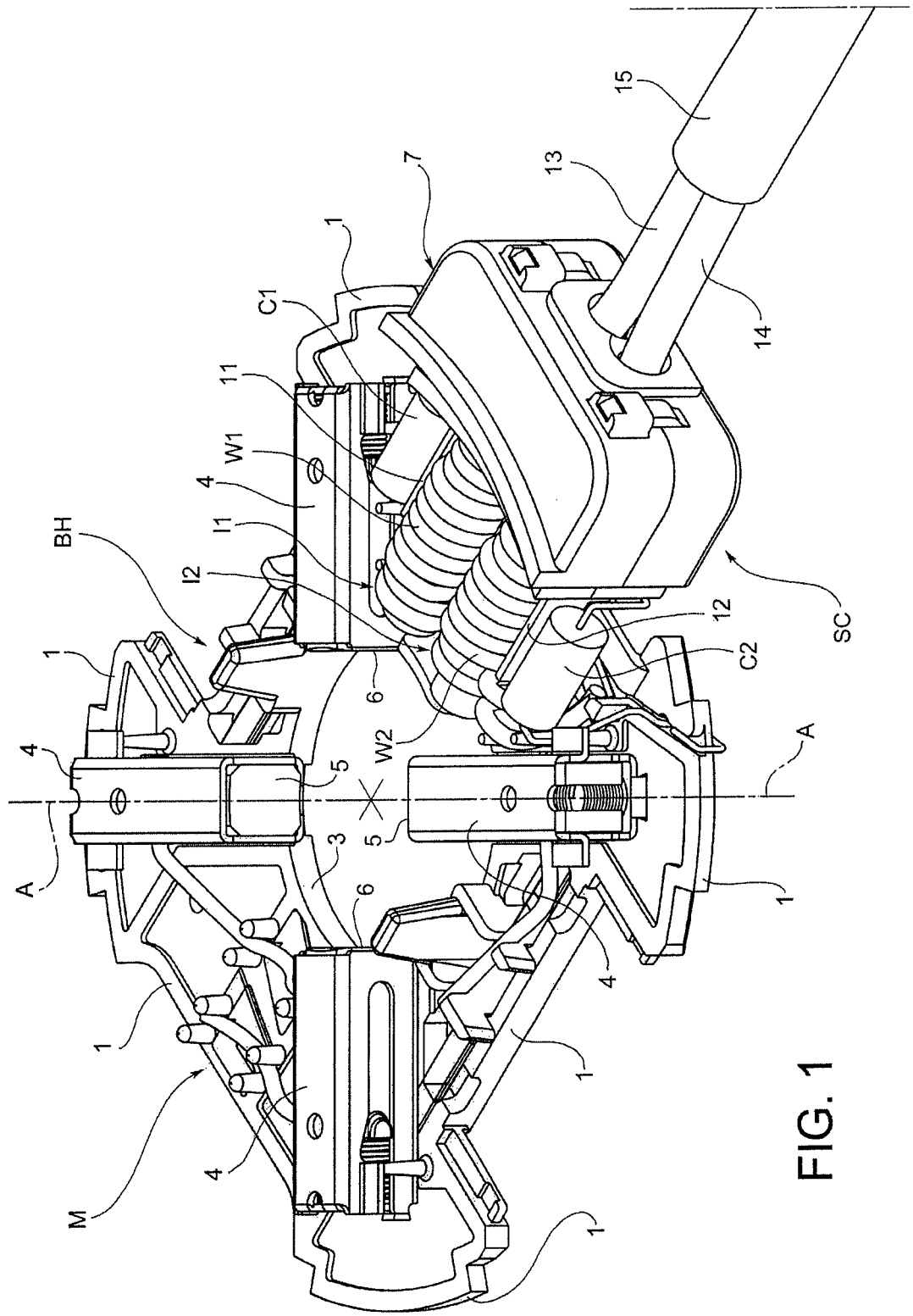
FIG. 1 is a perspective view of a part of an electric motor according to the invention, this part includes a brush holder and an electric supply connector which houses components of a filter for preventing the emission of electromagnetic interference (EMI)
Figure 2:
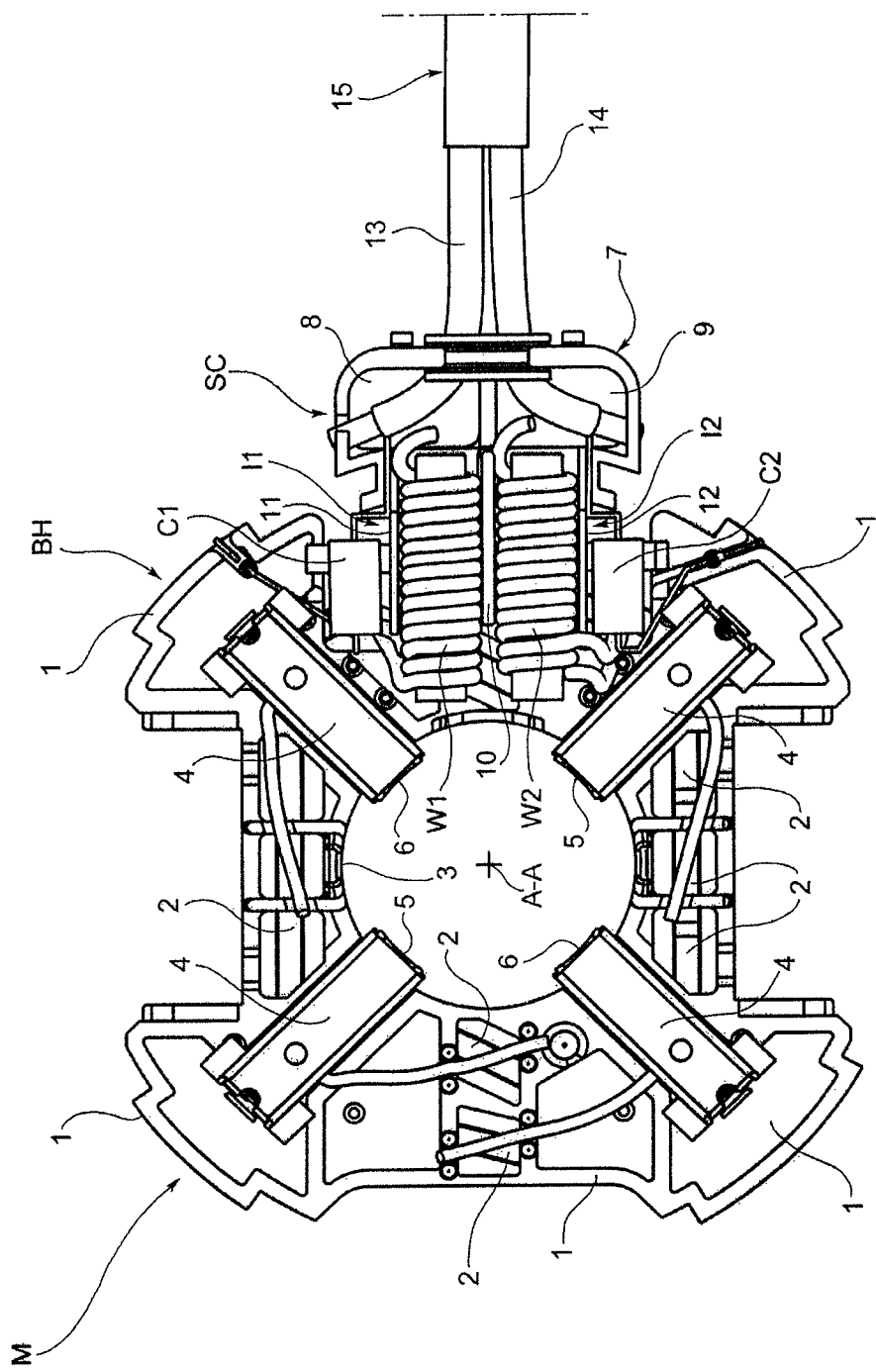
FIG. 2 is a top plan view of the assembly of FIG. 1, with a part removed.
Figure 6:
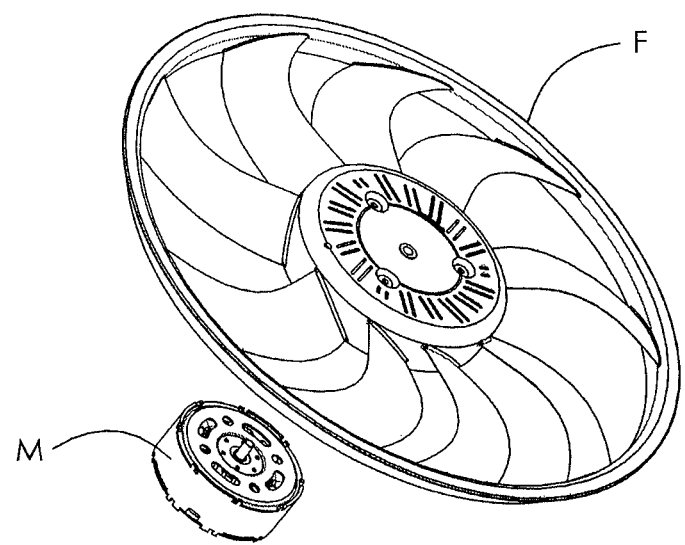
FIG. 6 is an exploded view of an electric motor and a cooling fan for a motor vehicle according to the present invention.

FIGS. 1 and 2 show the brush holder BH and an associated supply connector SC of a direct-current (D.C.) electric motor M with brushes according to a first preferred embodiment of the present invention. All the other components of such a motor M are of the type and have characteristics which are substantially known per se and therefore have not been shown. The motor M and a fan F, as used in a vehicle to cool the radiator, is shown in the exploded view of FIG. 6, by way of example only.

Figure 3:
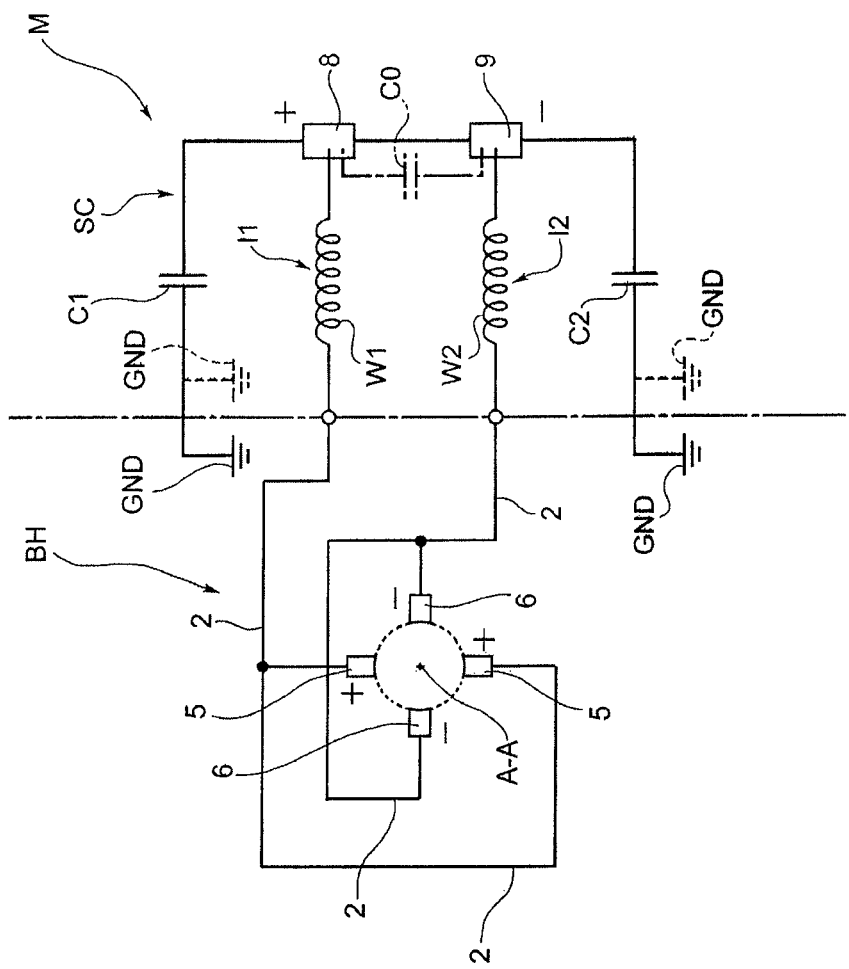
FIG. 3 is an electrical schematic diagram showing ways of connecting the components of the filter circuits for preventing the emission of electromagnetic disturbances and the brushes of the motor.

The brush holder BH comprises a carrier structure 1 which is for example made of moulded plastic and which has, embedded or otherwise incorporated therein, various conductive parts which are all indicated by 2 in FIG. 2 and intended to provide the connection (known per se) between the brushes 5, 6 which is shown in the left-hand part of FIG. 3.

The carrier structure 1 defines centrally an opening 3 for receiving the commutator (known per se and not shown) of the motor M. The carrier structure 1 has, mounted around the opening 3, a plurality of brush cages 4 in which respective electrically conductive brushes 5 and 6, which are respectively positive and negative, are displaceably mounted. The positive brushes 5 and the negative brushes 6 are electrically interconnected in the known manner shown in the left-hand part of FIG. 3.

The brush holder BH has, associated therewith, an electric supply connector SC which is connected laterally to the carrier structure 1 of the brush holder and extends in a near-radial transverse direction, in a plane which is essentially orthogonal to the axis A-A of rotation of the motor M.

Connector SC is stably connected, in the manner which will be described in greater detail below, to the brushes 5, 6 and allows connection of the latter to an external voltage supply source.

In the embodiment shown in FIGS. 1 and 2, the supply connector SC comprises a support body 7 made of electrically insulating material such as moulded plastic.

As can be seen in FIG. 2, inside the body 7, the supply connector SC comprises two supply terminals 8 and 9 which are positive and negative, respectively. In the embodiment shown these terminals are in the form of metal strips 8, 9 which are arranged coplanar with each other and transversely side-by-side, along a radial direction transverse to the axis of rotation A-A of the motor M.

The windings W1 and W2 of the inductors I1 and I2 have a respective end which is welded (or otherwise stably connected) to the positive supply terminal 8 and to the negative supply terminal 9, respectively. The other ends of these windings W1 and W2 are welded to electrically conductive components of the carrier structure 1 of the brush holder BH. The arrangement is such that the circuit configuration shown in FIG. 3 is formed.

In the embodiment shown by way of example, as can be seen in FIG. 2, three walls or partitions 10, 11 and 12 which are parallel to each other extend from the body 7 of the supply connector SC, in the manner of teeth or prongs of a trident. The central wall 10 extends between the two inductors I1 and I2, while the walls 11 and 12 extend on the outside, on opposite sides of these inductors.

In the embodiment according to FIGS. 1 and 2, the filter for preventing the emission of electromagnetic disturbances or EMI, comprises two capacitors C1 and C2 which have an essentially cylindrical shape and are arranged on the outside and parallel to the inductors I1 and I2, from which they are separated by the walls 11 and 12. As can be seen in FIG. 2, capacitors C1 and C2 have respective terminal wires which are stably connected to the positive supply terminal 8 and negative supply terminal 9, respectively, as likewise shown in the schematic diagram of FIG. 3. The other terminal wires of these capacitors are connected to a ground conductor (indicated by "GND" in FIG. 3).

The connection to this ground conductor may be performed, as shown in FIG. 2, by connecting said terminal wires of the capacitors C1 and C2 to corresponding conductive components of the brush holder BH which are intended in turn to be connected to the ground conductor of the motor. This connection mode is that shown in continuous lines in FIG. 3.

Alternatively, connection of the capacitors C1 and C2 to a ground conductor of the motor M may be performed outside of the brush holder BH, as schematically shown in broken lines in FIG. 3, for example by means of the same supply connector SC.

Although FIGS. 1 and 2 show a solution with two filter capacitors, it is possible to provide a filter circuit which, in addition to the two inductors I2 and I2, has at least the capacitor C2, i.e. the capacitor connected between the negative supply terminal 9 and the ground conductor of the motor M.

Figure 4:
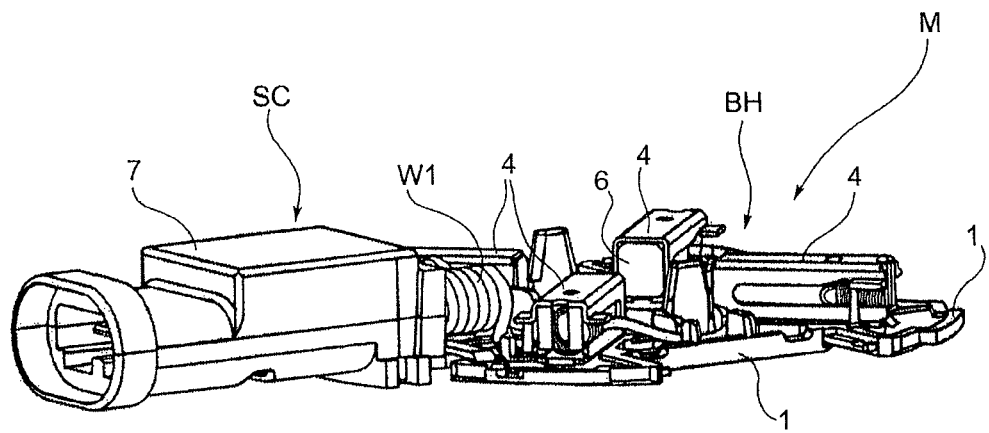
FIG. 4 is a perspective view similar to FIG. 1 of another embodiment of the present invention.
Figure 5:
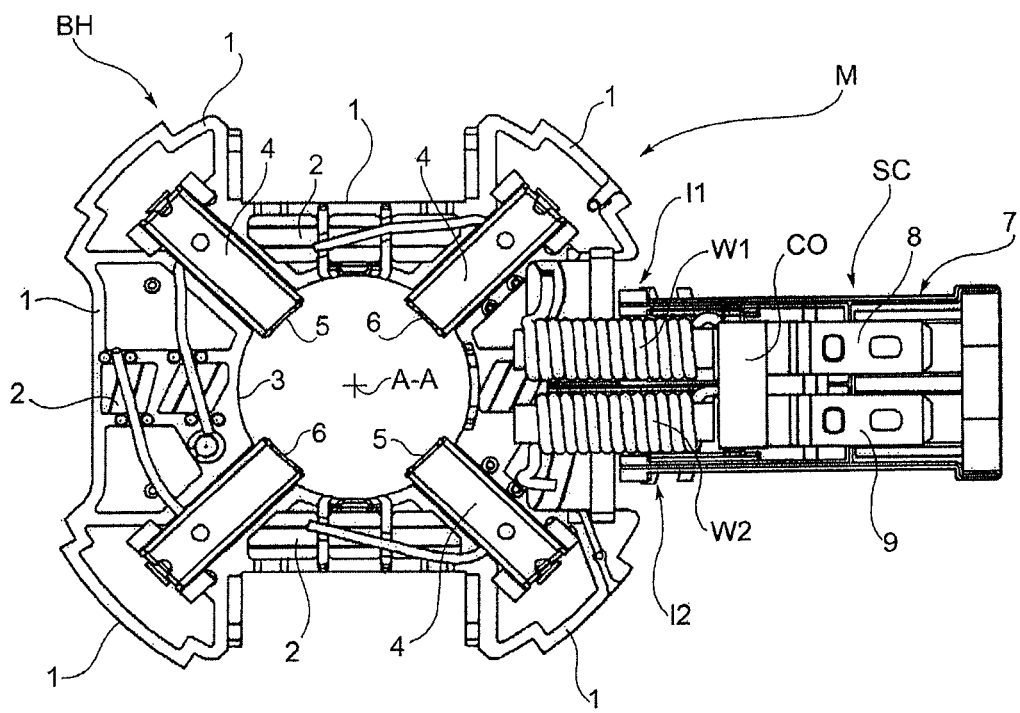
FIG. 5 is a top plan view of the assembly of FIG. 4, with a part removed.

Alternatively, or in addition, it is possible to envisage connecting a capacitor CO between the positive supply terminal 8 and negative supply terminal 9, as shown in broken lines in FIG. 3 and as shown in the embodiment of FIGS. 4 and 5. In FIG. 5, a part of the housing of the connecter SC has been removed to expose the capacitor CO and the supply terminals 8, 9.

In the embodiment according to FIGS. 1 and 2, respective insulated electrical conductors 13 and 14 of a flexible, multipolar, supply cable 15 are stably connected in the connector SC to the positive supply terminal 8 and negative supply terminal 9.

FIGS. 4 and 5 show a variation of first preferred embodiment, in which the motor is connected to a supply line by a plug in connector.

In these figures, parts and elements which are the same as or substantially equivalent to parts and elements already described have again been assigned the same reference numbers and letters used previously.

In the second embodiment of FIGS. 4 and 5, the filter circuit comprises a capacitor CO connected in the manner shown in broken lines in FIG. 3 and arranged physically between the inductors I1, I2, and the positive supply terminal 8 and negative supply terminal 9. The latter are not in the form of simple plates, but instead are connection terminals of the flat-pin type. In particular, the capacitor CO is arranged transversely with respect to the axes of the inductors I1 and I2.

A further difference of the second embodiment according to FIGS. 4 and 5 relates to the fact that the electric supply connector SC is of the female type, intended to be coupled with a corresponding complementary connector of the male type. The terminals within the supply connector SC are, optionally, male type flat pin terminals, intended to be coupled with corresponding female type terminals of the male type connector.

Obviously the scope of the invention also embraces embodiments in which the connector SC is of the male type, intended to be coupled with a corresponding complementary connector of the female type.

In the present invention, as illustrated by the two embodiments described, the filter for preventing the emission of EMI are housed inside the electric supply connector SC, at least partially.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. Electric D.C. motor, in particular for a cooling fan of a vehicle, comprising:
    a brush holder including a carrier structure having, mounted therein, about the axis of rotation of the motor, a plurality of brush cages inside which respective brushes connected, respectively, to a positive supply terminal and a negative supply terminal are radially displaceable;
    with the brush holder there being associated:
    an electric supply connector including a body connected laterally to the brush holder, for connection of the brushes to an external voltage source; and
    a filter for preventing the emission of electromagnetic interference, comprising at least a first and a second inductor connected between said positive and negative supply terminals and the corresponding brushes, and at least one capacitor,
    wherein the filter is housed inside the electric supply connector, and further comprises another capacitor, said capacitors are arranged parallel to the first and second inductors, on either side, respectively, of the assembly formed by the first and second inductors.

2. The motor of claim 1, wherein the electric supply connector comprises an electrically insulating support structure which extends in a plane substantially orthogonal to the axis of rotation of the motor and which includes a portion which is remote from the brush holder and where said positive and negative supply terminals are situated, and a portion which is close to the brush holder and where said first and second inductors are arranged.

3. The motor of claim 2, wherein said positive and negative supply terminals are arranged essentially coplanar and transversely side-by-side, parallel to a radial direction transverse with respect to the axis of rotation of the motor, and said first and second inductors comprise respective windings which are arranged side-by-side and parallel to each other, between said positive and negative supply terminals and the brush holder.

4. The motor of claim 1, wherein said at least one capacitor is connected between said positive and negative supply terminals.

5. The motor of claim 4, Wherein said capacitor has an essentially cylindrical shape and is arranged between said inductors and said positive and negative supply terminals, transversely with respect to the first and second inductors.

6. The motor of claim 5, wherein said capacitor is disposed transversely with respect to the first and second inductors.

7. The motor of Claim 1. wherein said at least one capacitor is connected between the negative supply terminal and a ground conductor of the motor.

8. The motor of claim 7, wherein said another capacitor is connected between the positive supply terminal and said ground conductor of the motor.

9. The motor of claim 1, wherein the electric supply connector is of the male or female type, intended to be coupled with a corresponding complementary electric connector of the female or male type.

10. The motor of claim 1, wherein in the electric supply connector respective insulated electrical conductors of a flexible supply cable are permanently connected to the positive and negative supply terminals.

11. The motor of Claim 1, wherein two walls Which are parallel to each other extend from the body of the supply connector and said capacitors are separated from the inductors by the two walls.

12. The motor of claim 11, wherein a central wall which is parallel to the two walls, extends from the body of the supply connector and the two inductors are completely separated by the central wall.

* * * * *